United States Patent [19]
Bazinet et al.

[11] Patent Number: 5,627,460
[45] Date of Patent: May 6, 1997

[54] DC/DC CONVERTER HAVING A BOOTSTRAPPED HIGH SIDE DRIVER

[75] Inventors: John P. Bazinet, Concord; John A. O'Connor, Merrimack, both of N.H.

[73] Assignee: Unitrode Corporation, Billerica, Mass.

[21] Appl. No.: 365,349

[22] Filed: Dec. 28, 1994

[51] Int. Cl.[6] ............................................. G05F 1/618
[52] U.S. Cl. ........................... 323/288; 323/224; 323/266; 323/284
[58] Field of Search .............................. 323/223, 225, 323/283–288, 266; 327/108

[56]  References Cited

U.S. PATENT DOCUMENTS

| | | | |
|---|---|---|---|
| 4,521,725 | 6/1985 | Phaneuf | 323/282 |
| 4,559,590 | 12/1985 | Davidson | 363/21 |
| 4,577,268 | 3/1986 | Easter et al. | 363/21 |
| 4,652,808 | 3/1987 | Mostyn et al. | 323/222 |
| 4,680,534 | 7/1987 | Tanaka et al. | 323/290 |
| 4,947,311 | 8/1990 | Peterson | 363/124 |
| 5,023,678 | 6/1991 | Kinzer | 357/23.4 |
| 5,126,651 | 6/1992 | Gauen | 323/222 |
| 5,233,509 | 8/1993 | Ghotbi | 363/89 |
| 5,258,662 | 11/1993 | Skovmand | 307/296.3 |
| 5,304,875 | 4/1994 | Smith | 307/571 |
| 5,408,150 | 4/1995 | Wilcox | 327/108 |
| 5,481,178 | 1/1996 | Wilcox et al. | 323/287 |

*Primary Examiner*—Peter S. Wong
*Assistant Examiner*—Shawn Riley
*Attorney, Agent, or Firm*—Weingarten, Schurgin, Gagnebin & Hayes LLP

[57] ABSTRACT

A synchronous step-down DC to DC converter includes a bootstrap capacitor monitored by a controller for maintaining a desired bootstrap voltage to drive a high side NMOS switch. The controller temporarily increases the duty cycle of the low side NMOS switch when the bootstrap voltage decreases below a predetermined level to maintain a minimum level of charge on the bootstrap capacitor.

14 Claims, 4 Drawing Sheets

DC/DC CONVERTER HAVING A BOOTSTRAPPED HIGH SIDE DRIVER

FIELD OF THE INVENTION

This invention relates generally to switching converters and more particularly, to Buck, or step-down converters having a bootstrapped high side driver.

BACKGROUND OF THE INVENTION

As is known in the art of switching power supplies, or converters, a Buck topology is used to convert an input voltage to a lower output voltage. A synchronous Buck converter includes a pair of switching transistors coupled in series across the input voltage source, with a high side switch coupled to the input voltage and a low side switch coupled to ground. The switches are controlled to alternatingly conduct with complementary duty cycles to maintain a predetermined output voltage. An output filter, including an inductor and a capacitor, is coupled to the interconnection between the pair of switching transistors and averages the switched input voltage to provide the output voltage.

The use of N-channel MOSFET devices for the converter switching elements is advantageous due to the relatively low drain to source resistance associated with such devices and thus, the correspondingly low power dissipation. More particularly, in order to realize the desired low drain to source resistance, the high side NMOS switch requires a gate drive signal of greater amplitude than the input voltage. Specifically, a gate to source voltage of approximately ten volts is required to fully enhance the NMOS switch.

Various techniques are available for generating the requisite gate voltage for the high side NMOS switch, including the use of a voltage doubler circuit or a boost converter. However, both of these techniques require an additional switching element and other circuitry, thereby disadvantageously adding to the cost and complexity of the converter.

Another technique for providing the necessary gate drive voltage to the high side NMOS switch is to charge a bootstrap capacitor with the input voltage, or a regulated version thereof. In order to avoid the necessity of using an additional switch, the charge path for the bootstrap capacitor includes the low side NMOS switch. However, in certain instances, such as where the input voltage is provided by a battery with a voltage which inherently decays over time or where the converter output is heavily loaded, a sufficient gate voltage level may not be continuously maintained. That is, in such applications, 100% duty cycle operation of the high side switch will be required. Since the bootstrap capacitor charges through the low side switch, its charge time and thus, the bootstrap voltage may decrease to an unacceptable level by the concomitantly reduced duty cycle of the low side switch.

SUMMARY OF THE INVENTION

In accordance with the invention, a step-down converter includes NMOS switches, a bootstrap capacitor for supplying a bootstrap voltage to a high side gate drive circuit, and a bootstrap controller for sensing the bootstrap voltage and adjusting the duty cycle of the low side switch so as to increase the bootstrap voltage when such voltage falls below a predetermined level. More particularly, the bootstrap capacitor is charged by a voltage regulator which, in turn is powered by the input voltage. The charge path for the bootstrap capacitor includes the low side switch. The bootstrap controller provides a control, or PWM override signal, to the PWM circuit to temporarily increase the duration of conduction of the low side switch when the bootstrap voltage falls below the predetermined level, thereby charging the bootstrap capacitor.

With this arrangement, a step-down converter utilizing NMOS switches is provided with a simple bootstrap capacitor arrangement to generate and maintain the desired voltage level for driving the high side switch. Charging the bootstrap capacitor through a path including the low side switch eliminates the need for an additional switching device. The bootstrap controller maintains the bootstrap voltage at a desired level even during periods when full, or nearly full duty cycle is required of the high side switch.

In one embodiment, the bootstrap controller includes a latch for providing the PWM override signal to increase the duty cycle of the low side switch when the following conditions occur simultaneously: the bootstrap voltage is below the predetermined level, at or near 100% duty cycle is commanded of the high side switch, and the high side switch is closed. The latch is reset when the following conditions occur simultaneously: the bootstrap voltage is equal to or greater than a second predetermined level and the high side switch is closed. This reset scheme ensures that the bootstrap controller does not affect the duty cycle of the switches unless the bootstrap voltage is below a predetermined level corresponding to the desired gate drive level for the high side switch, so as to permit virtual 100% duty cycle operation of the high side switch. That is, the duty cycle of the high side switch deviates from a commanded 100% only for the relatively few switching cycles necessary to charge the bootstrap capacitor to the desired voltage level.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
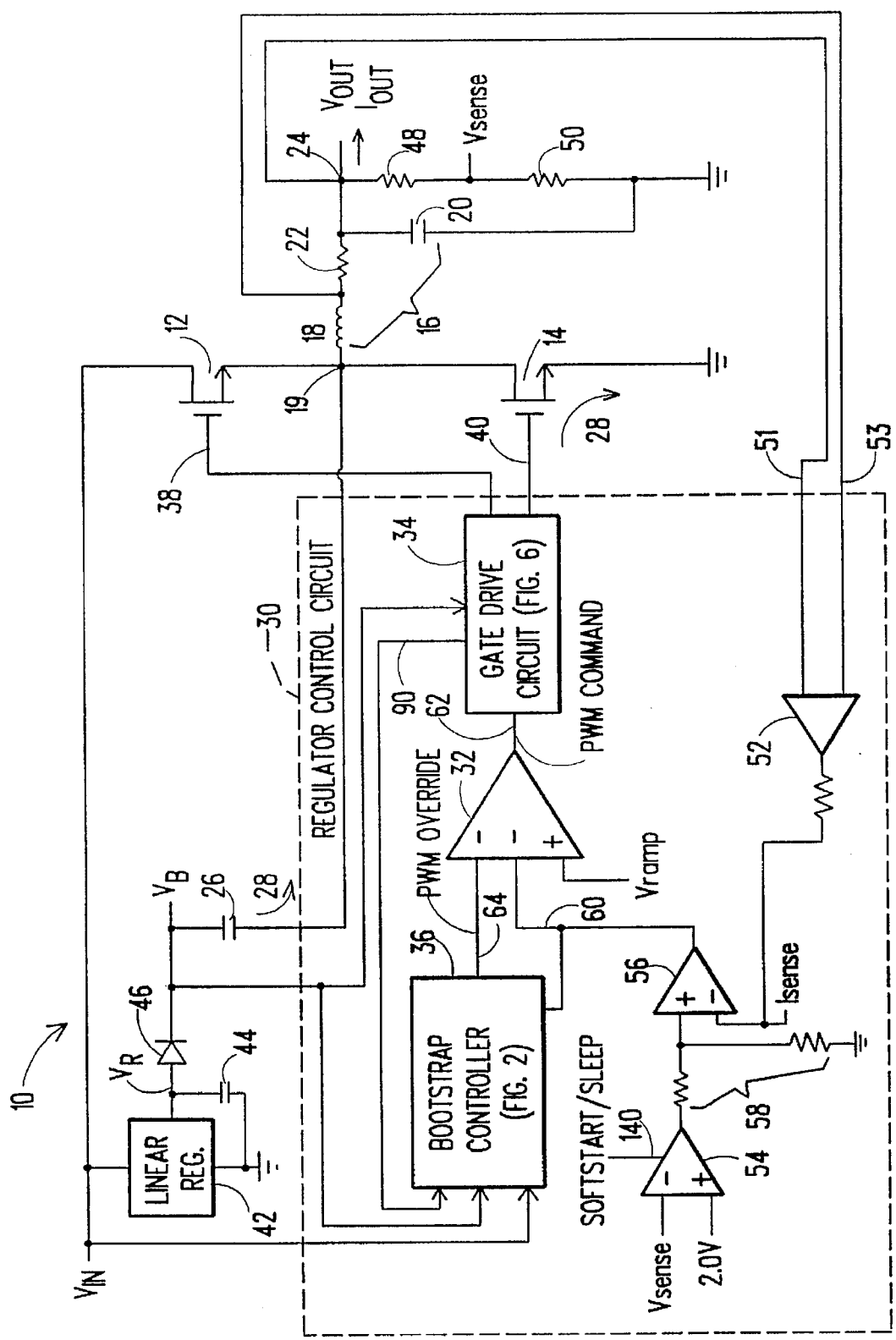
FIG. 1 is a schematic of a step-down converter in accordance with the present invention.

Referring to FIG. 1, a Buck, or step-down converter 10 which converts a DC input voltage $V_{IN}$ to a lower DC output voltage $V_{OUT}$ includes a pair of series connected synchronously operated switches, 12, 14 across which the input voltage $V_{IN}$ is switched at a relatively high frequency, such as one to two hundred kilohertz. An output filter 16, including an inductor 18 and a capacitor 20, is coupled between the interconnection node 19 of the switches 12, 14 and an output terminal 24 of the converter 10 at which the output voltage $V_{OUT}$ is provided. A current sense resistor 22 is connected between the inductor 18 and the capacitor 20, as shown.

A regulator control circuit 30 includes a pulse width modulator (PWM) circuit 32 and a gate drive circuit 34. In general, the control circuit 30 receives a signal $V_{sense}$ indicative of the output voltage $V_{OUT}$ and signals 51, 53 indicative of the output current $I_{sense}$ and provides, via the gate drive circuit 34, gate drive signals 38, 40 to control the switches 12, 14, respectively. Gate drive signals 38, 40 cause the switches 12, 14 to conduct in an alternating manner with complementary duty cycles, so as to maintain the output voltage $V_{OUT}$ at a predetermined level.

Switches 12, 14 are NMOS FETs. Use of NMOS FETs as the switching devices is advantageous due to the relatively low drain to source resistance associated therewith and thus, concomitantly low power dissipation. A first one of the switches 12 is connected to the input voltage $V_{IN}$ and will be referred to hereinafter as the high side switch 12. The second switch 14 is connected to ground and will be referred to hereinafter as the low side switch. High side switch 12 has a drain terminal connected to the input voltage $V_{IN}$, a gate terminal receiving gate drive signal 38, and a source terminal connected to a drain terminal of low side switch 14 and to the output filter inductor 18. The low side switch 14 has a gate terminal receiving gate drive signal 40 and a source terminal connected to ground, as shown.

A bootstrap capacitor 26 is charged through a charging path including low side switch 14, as indicated by arrows 28, and provides a bootstrap voltage $V_B$ to the gate drive circuit 34 sufficient to fully enhance the high side switch 12. The control circuit 30 further includes a bootstrap controller 36 which provides a virtual 100% duty cycle mode of operation, as will be described. Suffice it here to say that the bootstrap controller 36 senses the bootstrap voltage $V_B$ across the bootstrap capacitor 26 and temporarily increases the duty cycle of the low side switch 14 in response to the bootstrap voltage falling below a first predetermined level to permit charging of the bootstrap capacitor 26. With this arrangement, the bootstrap voltage $V_B$ is maintained at a desired level corresponding to the gate drive voltage necessary to fully enhance the high side switch 12.

The converter 10 includes a linear regulator 42 which receives the input voltage $V_{IN}$ and which provides a regulated voltage $V_R$ to charge the bootstrap capacitor 26. A bypass capacitor 44 is connected between the regulated voltage output and ground and a diode 46 is provided with the anode connected to the regulated voltage $V_R$ and the cathode connected to a first terminal of the bootstrap capacitor 26. A second terminal of the bootstrap capacitor 26 is connected to the interconnection node 19 between the source terminal of high side switch 12 and the drain terminal of low side switch 14, as shown. In one illustrative embodiment, the input DC voltage $V_{IN}$ is provided by a battery with a nominal voltage range of between 11–36 volts and the linear regulator 42 provides a nominal regulated voltage $V_R$ of 11.0 V. Preferably, the control circuit 30 and linear regulator 42 are provided in a monolithic integrated circuit.

During portions of each switching cycle when the high side switch 12 conducts, the bootstrap capacitor 26 discharges through the gate drive circuit 34. During alternating portions of the switching cycle, when the low side switch 14 conducts, the bootstrap capacitor 26 is charged by the regulated voltage $V_R$ so as to provide a bootstrap voltage $V_B$ of 11.0 volts minus the forward voltage drop of diode 46, as is desired. The charge path is through the low side switch 14, as indicated by arrows 28.

More particularly, since the bootstrap capacitor 26 is referenced to the interconnection node 19, the bootstrap voltage $V_B$ is approximately ten volts above the input voltage $V_{IN}$. That is, when the high side switch 12 turns on, the node 19, which is close to ground (since the low side switch 14 was previously on) rises to approach the input voltage $V_{IN}$. As this occurs, the bootstrap voltage $V_B$, being referenced to this rising potential node 19 also rises, so as to provide a bootstrap voltage $V_B$ of approximately ten volts greater than the input voltage $V_{IN}$.

As noted above, the control circuit 30 receives a signal $V_{sense}$ indicative of the output voltage $V_{OUT}$. More particularly, the output voltage indicative signal $V_{sense}$ is derived from a resistor divider coupled between the output voltage $V_{OUT}$ and ground and including resistors 48, 50. The converter 10 of FIG. 1 is a current mode converter. Thus, the control circuit 30 further receives signals 51, 53 from across a current sense resistor 22, as shown. The voltage across the resistor 22 is sensed by a differential amplifier 52, the output of which provides a signal $I_{sense}$ indicative of the output current.

The control circuit 30 includes a voltage amplifier 54 and a current amplifier 56. The voltage amplifier 54 provides a signal representative of the difference between the output voltage indicative signal $V_{sense}$ and a fixed reference voltage, such as 2.0 V. The voltage amplifier 54 may further receive a softstart signal 140 in order to clamp the output voltage of the amplifier 54 to provide a controlled start up of the converter. The user controllable softstart signal 140 also controls a "sleep mode" of converter operation, as will be described in conjunction with FIG. 5. The output of the voltage amplifier 54 is coupled to an input of the current amplifier 56 through a resistor divider 58. The current amplifier 56 provides an error signal 60 to an input of the PWM 32.

The PWM 32 compares the error signal 60 to a sawtooth ramp signal $V_{ramp}$ to provide a PWM command signal 62 to the gate drive circuit 34. The PWM command signal 62 determines the duty cycles of the NMOS switches 12, 14. More particularly, the duty cycles of switches 12, 14 refer to the respective ratio of "on time" to the switching period. As noted above, the duty cycle of switches 12, 14 are complementary with respect to one another, such that when one of the switches is on, or closed, the other is off, or open. The gate drive circuit 34, which will be described in greater detail below in conjunction with FIG. 6, receives the PWM command signal 62 and the bootstrap voltage $V_B$ and provides gate drive signals 38, 40 to switches 12, 14, respectively.

The bootstrap controller 36 receives and senses the bootstrap voltage $V_B$ and provides a PWM override signal 64 to the PWM 32 in response to the bootstrap voltage $V_B$ being below a first predetermined level, as will be described further in conjunction with FIG. 2. Suffice it here to say that when the bootstrap voltage $V_B$ falls below the first predetermined level, corresponding to the desired level of gate drive signal for the high side switch 12, the PWM override signal 64 causes the PWM 32 to temporarily adjust the duty cycles of the switches 12, 14 in order to charge the bootstrap capacitor 26 to the desired voltage. In this way, the bootstrap voltage $V_B$ is maintained at the desired level. Moreover, this advantageous result is achieved without sacrificing output voltage regulation. This is because, when the bootstrap voltage $V_B$ is sensed to be below the first predetermined level, the duty cycle adjustment necessary to raise the bootstrap voltage back to the desired level lasts for only a few switching cycles.

Figure 2:
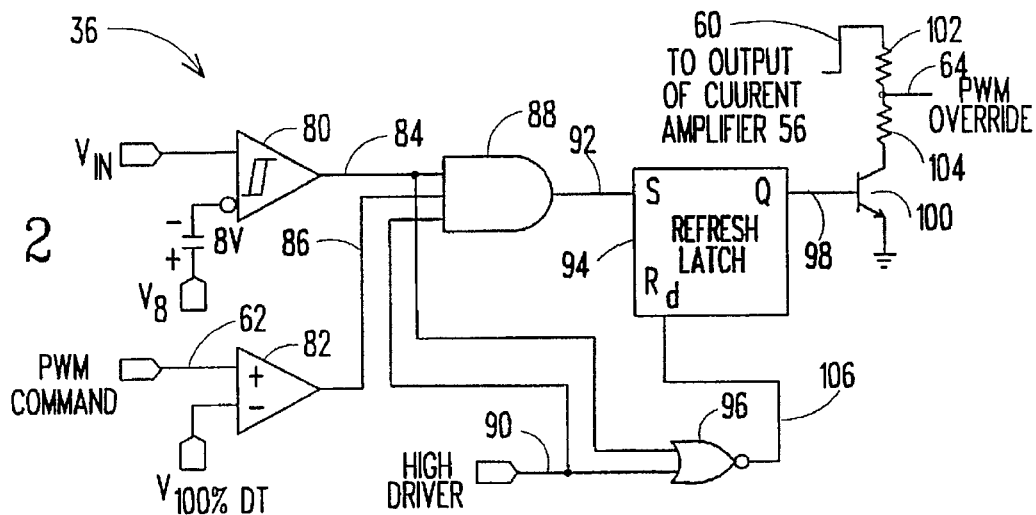
FIG. 2 is a schematic of the bootstrap controller of FIG. 1.

Referring now also to FIG. 2, the bootstrap controller 36 is shown in greater detail. The controller 36 includes a comparator 80 which compares the input voltage $V_{IN}$ to a voltage equal to the bootstrap voltage $V_B$ minus a fixed offset voltage, such as 8.0 V. The output of the comparator 80 thus indicates whether or not the bootstrap voltage $V_B$ is greater or less than the first predetermined level of $V_{IN}+8.0$ V. Specifically, the output of the comparator 80 is at a logic high level when the bootstrap voltage $V_B$ is less than $V_{IN}+8.0$ V and is at a logic low level when the bootstrap voltage $V_B$ is greater than or equal to a second predetermined level of $V_{IN}+9.5$ V.

The bootstrap controller 36 further includes a second comparator 82 which compares the PWM command signal 62 (FIG. 1) to a fixed reference voltage $V_{100\%D_T}$, which corresponds to the voltage level of the PWM command signal 62 when an approximately 100% duty cycle is commanded of the high side switch 12. In the case where the voltage $V_{100\%D_T}$ corresponds to a 100% duty cycle for the high side switch, the output signal 86 of the comparator 82 is at a logic high level when the PWM command signal 62 corresponds to 100% duty cycle of the high side switch 12 and is at a logic low level when lesser duty cycles are required of the high side switch 12. The voltage level of the $V_{100\%D_T}$ signal is selected so that the bootstrap controller 36 only affects the duty cycles of the switches 12, 14 when the bootstrap voltage has decayed below the first predetermined level, thereby indicating that the low side switch is not closed for a long enough duration to permit the bootstrap capacitor to remain charged. The voltage $V_{100\%D_T}$ will be described hereinafter as corresponding to the voltage level of the PWM command signal 62 when the duty cycle of switch 12 is at 100%. More generally however, voltage $V_{100\%D_T}$ may correspond to the level of the PWM command signal 62 when the duty cycle of switch 12 is between approximately 85%–100%.

Figure 6:
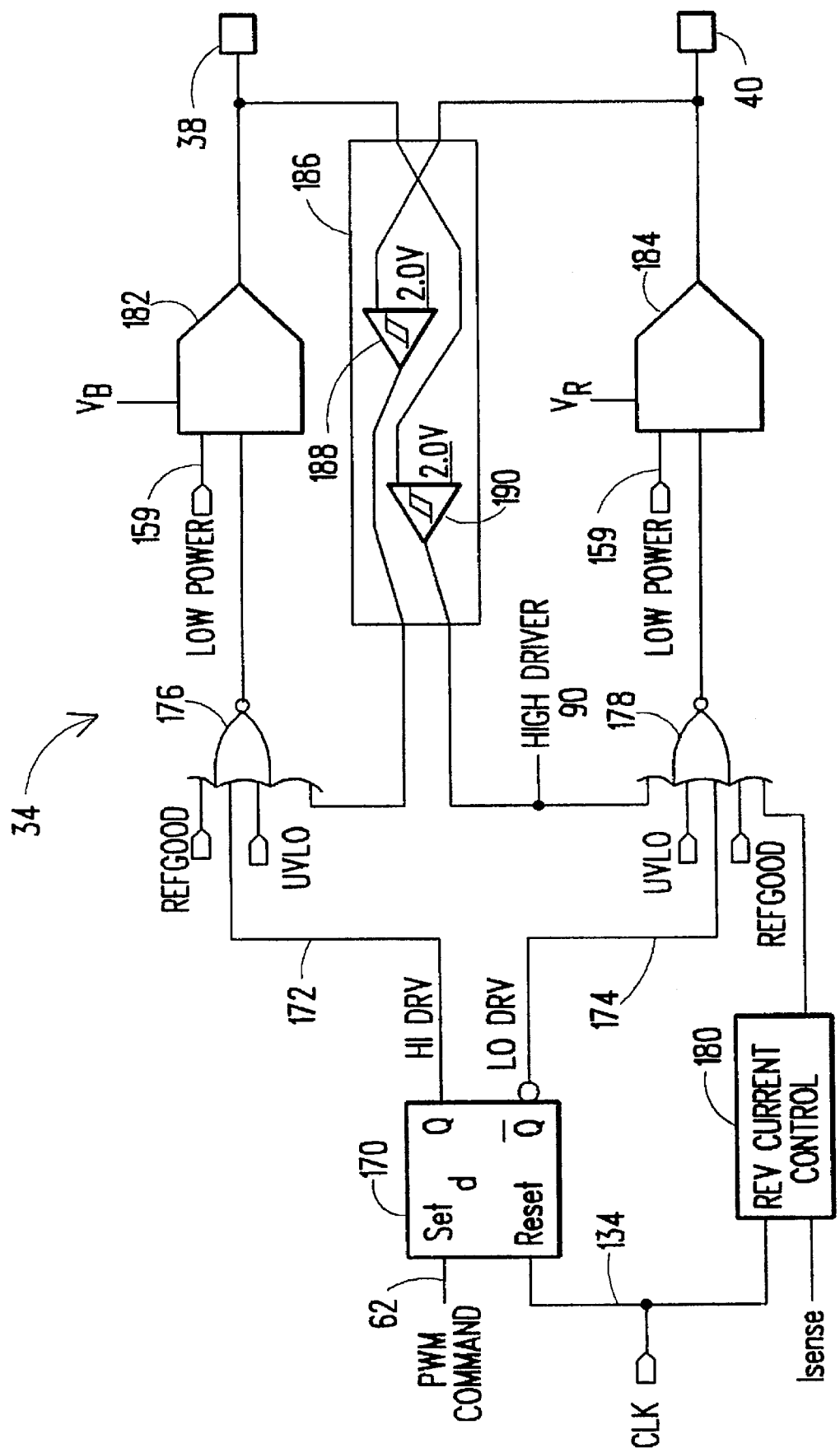
FIG. 6 is a schematic of the gate drive circuit of FIG. 1.

Comparator output signals 84 and 86 are coupled to inputs of an AND gate 88. Coupled to a third input of AND gate 88 is a high driver signal 90 provided by the gate drive circuit 34 (FIGS. 1 and 6). The high driver signal 90 is in a logic high state when the high side switch 12 is closed and is in a logic low state when the high side switch 12 is open, as will become apparent from the discussion of FIG. 6 below. The output signal 92 of AND gate 88 is coupled to the input of a latch, or flip-flop 94. The reset input of latch 94 receives the output signal of a NOR gate 96, the inputs to which are provided by logic signals 84 and 90, as shown.

The output logic signal 92 of AND gate 88 is in a logic high state when each of the three input signals 84, 86, and 90 is in a logic high state. Thus, logic signal 92 is in a logic high state when the bootstrap voltage $V_B$ is less than $V_{IN}+8.0$ V, the PWM command signal 62 is at a level corresponding to a 100% duty cycle of the high side switch 12, and the high side switch 12 is closed. With the logic signal 92 in a logic high state, the latch 94 is set.

When the latch 94 is set, the PWM override signal 64 causes the PWM 32 to increase the duty cycle of the low side switch 14 and concomitantly to decrease the complementary duty cycle of the high side switch 12, to permit the charging of the bootstrap capacitor 26 (FIG. 1). More particularly, the output signal 98 of latch 94 is connected to the base terminal of a bipolar transistor 100, the emitter terminal of which is connected to ground. The collector terminal of transistor 100 is connected to a resistor divider including resistors 102, 104. The PWM override signal 64 is provided at the interconnection of series connected resistors 102, 104, as shown.

In operation, when the latch 94 is set, output signal 98 is in a logic high state, causing the collector of transistor 100 to approach ground and the voltage level of the PWM override signal 64 to be determined by resistors 102, 104. More particularly, resistors 102, 104 are selected so that when the latch 94 is set, the PWM override signal 64 is at a voltage level less than the error signal 60 (FIG. 1) so that the override signal controls the PWM 32. Specifically, the PWM override signal 64 causes the duty cycles of switches 12, 14 to be at a level that permits the bootstrap voltage $V_B$ to be replenished within a few switching cycles in order to avoid degradation of the output voltage $V_{OUT}$, such as approximately 50%. In this way, the charging path from the input voltage $V_{IN}$ through the linear regulator 42, diode 46, capacitor 26, and low side switch 14 is available for approximately one-half of each switching cycle to charge the bootstrap capacitor 26.

Once the latch 94 is set, bootstrap capacitor 26 is charged until the bootstrap voltage $V_B$ rises to a second predetermined, desired level. The second predetermined level corresponds to a hysteresis value above the first predetermined level, such as 1.5 volts greater than the first predetermined level of $V_{IN}+8.0$ volts. More particularly, once the bootstrap voltage $V_B$ rises to the second predetermined level, the output signal 106 of the NOR gate 96 transitions to a logic high state, since the bootstrap voltage $V_B$ is greater than or equal to $V_{IN}+9.5$ V and the high side switch 12 is closed, as indicated by logic high levels of signals 84, 90, respectively. When the latch 94 is reset, latch output signal 98 transitions to a logic low level, causing the PWM override signal 64 to be pulled to the error signal 60 at the output of the current amplifier 56 through resistor 102. Since the error signal 60 will be less than the PWM override signal 64, the error signal 60 controls the PWM command signal 62 and thus also the duty cycles of the switches 12 and 14. Thus, it is apparent that once the bootstrap voltage $V_B$ rises to a level greater than or equal to $V_{IN}+9.5$ V and the high side switch 12 is closed, the bootstrap controller 36 no longer affects the PWM operation and the duty cycles of switches 12 and 14.

Figure 3:
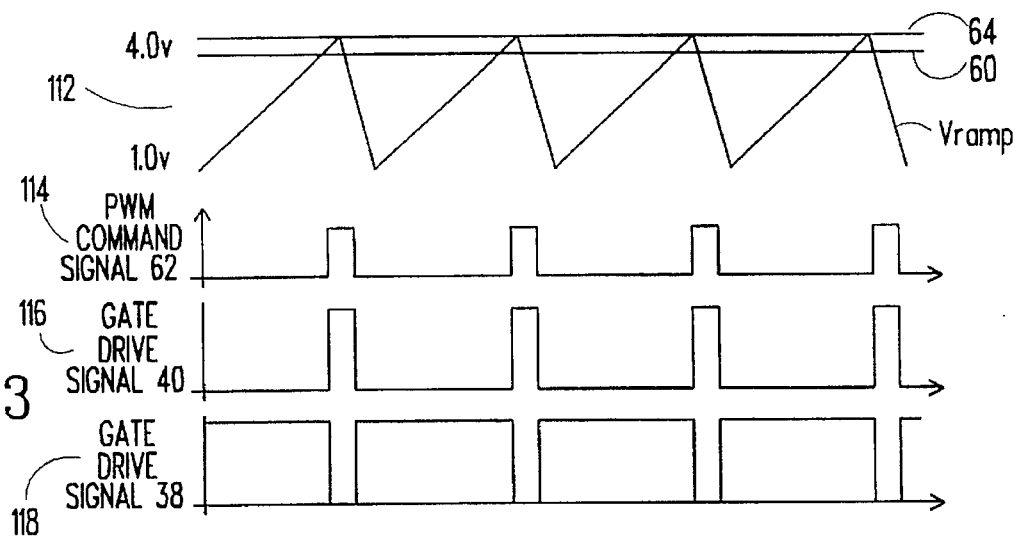
FIG. 3 is a PWM signal diagram showing the PWM related signals under illustrative operating conditions.
Figure 4:
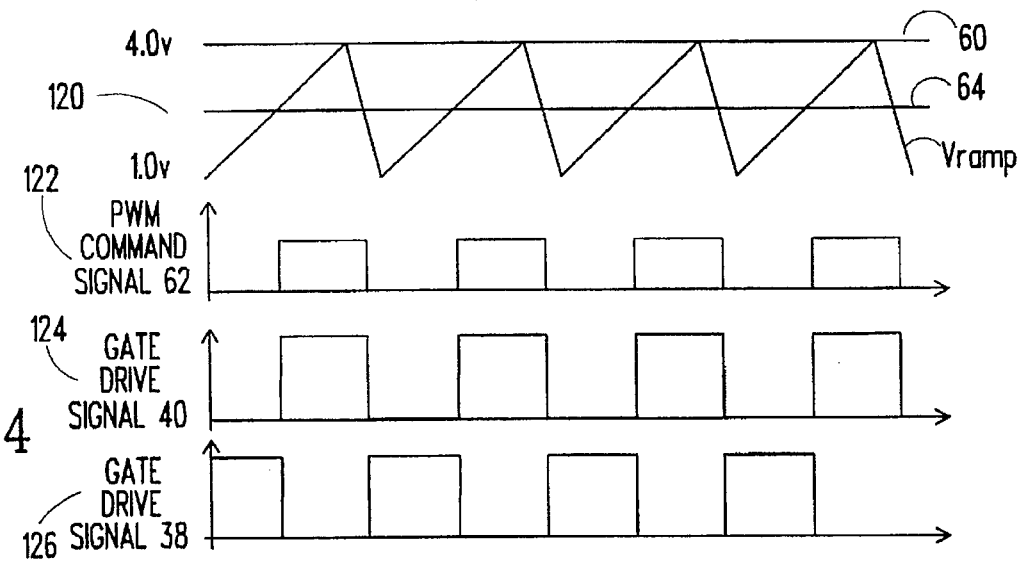
FIG. 4 is a PWM signal diagram showing the PWM related signals under a different set of illustrative operating conditions.

The operation of the bootstrap controller 36 and the PWM 32 is illustrated by the signal diagrams of FIGS. 3 and 4. Signal diagram 112 in FIG. 3 shows exemplary PWM input signals $V_{ramp}$, error signal 60, and PWM override signal 64. The illustrated PWM override signal 64 is characteristic of the bootstrap voltage $V_B$ being greater than $V_{IN}+8.0$ V. Since the error signal 60 is lower than the PWM override signal 64, the error signal controls the PWM command signal 62. Specifically, the PWM command signal 62 is high when the ramp voltage $V_{ramp}$ is greater than the error signal 60, as shown in signal diagram 114. The gate drive signal 40 provided to the gate terminal of low side switch 14 is a buffered, amplified version of the PWM command signal 62, as shown in signal diagram 116, and as will be described further in conjunction with FIG. 6. The complementary gate drive signal 38 provided to the gate terminal of the high side switch 12 is an inverted version of gate drive signal 40, as shown in signal diagram 118.

When the latch 94 is set, causing the PWM override signal 64 to be at a voltage set by resistors 102, 104, the override signal 64 is lower than the error signal 60, as shown in signal diagram 120 of FIG. 4. Recall that the latch 94 is set, causing the PWM override signal 64 to be below the error voltage 60, when the error signal 60 is at a level corresponding to at or near 100% duty cycle of the high side switch 12, as illustrated by the error signal 60 being at the top of the ramp signal $V_{ramp}$. Under such operating conditions, the PWM override signal 64 governs the PWM command signal 62 such that the PWM command signal 62 is high when the ramp signal $V_{ramp}$ is greater than the PWM override signal 64, as is evident from the signal diagram 122.

It may be desirable to limit the extent to which the PWM override signal 64 can increase the duty cycle of the low side switch 14 in order to permit the bootstrap capacitor 26 to be replenished within a few switching cycles without sacrificing output voltage regulation. In the illustrative embodiment, the PWM override signal 64 is limited to approximately two volts, thereby limiting the duty cycle that can be commanded of the switches 12, 14 to approximately 50% when the PWM override signal 64 governs the PWM operation, as shown in FIG. 4.

Figure 5:
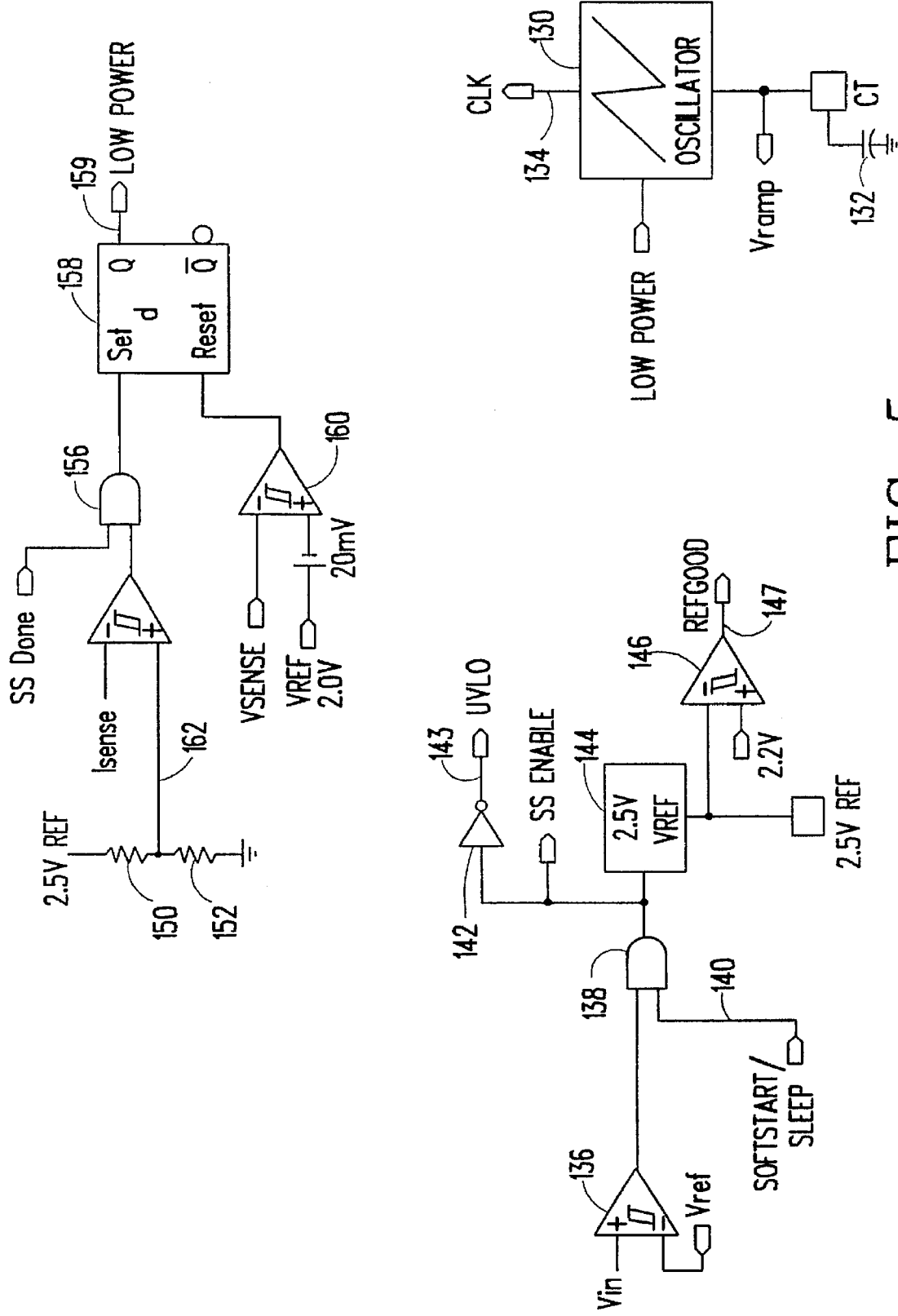
FIG. 5 is a schematic of additional features of the regulator control circuit of FIG. 1.

Referring also to FIG. 5 additional features of the control circuit 30 of FIG. 1 are shown to include an oscillator 130 adapted for coupling to a timing capacitor 132. The oscillator 130 provides a clock signal 134 and the ramp voltage $V_{ramp}$. The clock signal 134 determines the switching frequency of the converter 10.

Start-up circuitry is provided for disabling the gate drive circuit 34 until the input voltage $V_{IN}$ has risen to a satisfactory level for regulated converter operation. More particularly, the input voltage $V_{IN}$ is coupled to a comparator 136 which compares the input voltage $V_{IN}$ to a reference voltage $V_{ref}$. The output of the comparator 136 is coupled to an AND gate 138, a second input to which is provided by the softstart/sleep signal 140 (FIG. 1). Recall that the softstart input to the voltage amplifier 54 (FIG. 1) ensures a controlled start-up by clamping the voltage amplifier output for a selected duration after start-up. The softstart input also governs a user controllable low power, or "sleep" mode of operation.

Sleep mode operation is commenced when the softstart/sleep signal 140 is below approximately 0.5 V. At this level, the output of AND gate 138 (i.e., the SS enable signal) is low, thereby preventing the 2.5 V reference voltage regulator 144 from providing 2.5 V, which in turn is used to generate the 2.0 V input to the voltage amplifier 54 (FIG. 1). The SS enable signal also enables the softstart feature.

An inverter 142 provides an under voltage lockout feature to inhibit the gate drive signals 38, 40 until the input voltage $V_{IN}$ has reached a level necessary for regulated operation. To this end, the inverter output UVLO signal 143 is coupled to the gate drive circuit 34, as described below.

A comparator 146 monitors the 2.5 V reference voltage by comparing the reference voltage to a fixed voltage of 2.2 V. If the 2.5 V reference voltage is greater than 2.2 V, then a REFGOOD output signal 147 of comparator 146 is low; whereas, if the 2.5 V reference voltage is less than 2.2 V, then the REFGOOD output signal 147 of comparator 146 is high. The REFGOOD signal 147 is also coupled to the gate drive circuit 34, as described below.

Also shown in FIG. 5 is circuitry for implementing an optional standby, or low power output mode of operation in which the control circuit 30 disables the gate drive circuit 34 and the oscillator 130, preserving both quiescent supply current consumption and gate drive charge current. Standby mode operation is initiated when the current through the output inductor 18 drops to a user programmable fraction of the specified full load output current. During standby mode operation the output current requirements are supplied by the output capacitor 20 (FIG. 1). Normal operation resumes once the output voltage $V_{OUT}$ decays by approximately 1% of its nominal value.

More particularly, the output current level at which the standby mode commences is set by resistors 150, 152. The voltage 162 at the interconnection of resistors 150, 152 is coupled to the non-inverting input of comparator 154, the inverting input to which receives the output current indicative signal $I_{sense}$ (FIG. 1). The output of comparator 154 is coupled to an input of AND gate 156, the output of which is coupled to a flip-flop 158. The second input to AND gate 156 is provided by an SS done signal which indicates when the softstart feature has timed out. A low power signal 159 is provided at the output of the flip-flop 158 to disable the gate drive circuit 34, as described below in conjunction with FIG. 6. The flip-flop 158 is reset by the output of a comparator 160, the inverting input to which receives the output voltage indicative signal $V_{sense}$ and the non-inverting input to which receives a 2.0 V reference voltage shifted by a fixed offset, such as twenty millivolts.

Referring to FIG. 6, the gate drive circuit 34 (FIG. 1) which receives the PWM command signal 62 and provides the gate drive signals 38, 40, is shown. A flip-flop 170 provides a high side drive signal 172 which transitions in accordance with the PWM command signal 62 and a low side drive signal 174 which is an inverted version of the high side drive signal 172 to NOR gates 176, 178, respectively. NOR gates 176, 178 additionally receive the REFGOOD signal 147 and the UVLO signal 143 (FIG. 5). NOR gate 178 additionally receives an output signal from a reverse current control circuit 180.

The reverse current control circuit 180 is responsive to the output current indicative signal $I_{sense}$ and senses when the direction of current in the output inductor 18 (FIG. 1) changes such that current flows from the capacitor 20 into the inductor 18. When the output current direction so reverses, the reverse current control circuit 180 disables the low side gate drive signal 40 for the rest of the switching cycle during which the reverse current is detected. To this end, the clock signal 134 is coupled to the reverse current control circuit 180, as shown.

The outputs of NOR gates 176, 178 are coupled to inputs of buffer amplifiers 182, 184, the outputs of which provide gate drive signals 38, 40 respectively. More particularly, the high side buffer amplifier 182 is powered by the bootstrap voltage $V_B$, whereas the low side buffer amplifier 184 is powered by the regulated voltage $V_R$ (FIG. 1). Also coupled to buffer amplifiers 182, 184 is the low power signal 159 (FIG. 5). When the converter is in the standby mode, buffer amplifiers 182, 184 are disabled by the low power signal 159.

The gate drive circuit 34 also includes an anti-crossconduction circuit 186 which ensures that the switches 12, 14 do not conduct at the same time. To this end, the anti-crossconduction circuit 186 includes a first comparator 188 which compares the low side gate drive signal 40 to a reference voltage of approximately 2.0 V. The output signal of comparator 188 is coupled to the input of NOR gate 176, as shown. With this arrangement, if the low side gate drive signal 40 is high, then the output of comparator 188 is high, thereby preventing the output of the NOR gate 176 from going high and driving the high side switch 12 to conduct. Note that the comparator 188 additionally provides a slight propagation delay so as to delay transitions of the high side gate drive signal 38 relative to transitions of the low side gate drive signal 40.

Similarly, the anti-crossconduction circuit 186 includes a second comparator 190 which compares the high side gate drive signal 38 to a reference voltage of approximately 2.0 V. When the high side gate drive signal 38 is high, the output of comparator 190 is high. The output of comparator 190 provides the high driver signal 90 (FIG. 2) and is coupled to an input to NOR gate 178, as shown. Thus, when the output of comparator 190 is high, the output of NOR gate 178 is prevented from going high to drive the low side switch 14 to conduct. As in the case of comparator 188, comparator 190 provides a slight propagation delay so as to delay transitions of the low side gate drive signal 40 relative to transitions of the high side gate drive signal 38.

Having shown the preferred embodiment, those skilled in the art will realize many variations are possible which will still be within the scope and spirit of the claimed invention. Therefore, it is the intention to limit the invention only as indicated by the scope of the claims.

We claim:

1. A step-down converter for converting an input voltage to a lower output voltage, said converter comprising:

a pair of NMOS switches coupled in series, a first one of said switches being coupled to said input voltage and a second one of said switches being coupled to ground;

an output filter coupled to said pair of switches, said output filter providing an output terminal at which said output voltage is provided;

a bootstrap capacitor charged by said input voltage through a path including said second switch and having a bootstrap voltage thereacross; and a control circuit receiving a signal indicative of said output voltage and providing gate drive signals to each of said pair of switches to control the duty cycles of said switches so as to maintain said output voltage substantially constant, said control circuit including a sensor for sensing said bootstrap voltage and increasing the duty cycle of said second switch in response to said bootstrap voltage being below a first predetermined level and said first switch being closed.

2. The step-down converter recited in claim 1 wherein said sensor of said control circuit additionally decreases the duty cycle of said first switch when said duty cycle of said second switch is increased.

3. The step-down converter recited in claim 1 wherein said control circuit comprises:

a PWM circuit comparing said signal indicative of said output voltage to a ramp voltage and providing a PWM command signal in response to said comparison, said PWM command signal being indicative of said duty cycles of said pair of switches;

a gate drive circuit responsive to said PWM command signal and said bootstrap voltage for providing said gate drive signals to each of said pair of switches; and a bootstrap controller for sensing said bootstrap voltage and providing a PWM override signal to said PWM circuit, said PWM override signal causing said duty cycle of said second switch to be increased.

4. The step-down converter recited in claim 3 wherein said bootstrap controller comprises a latch for providing said PWM override signal when said bootstrap voltage is below said first predetermined level and said PWM command signal is at a level corresponding to approximately 100% duty cycle of said first switch and said first switch is closed.

5. The step-down converter recited in claim 1 wherein said first predetermined level of said bootstrap voltage is greater than said input voltage.

6. The step-down converter recited in claim 4 wherein said latch is reset when said bootstrap voltage is greater than a second predetermined level, greater than said first predetermined level, and said first switch is closed.

7. The step-down converter recited in claim 1 further comprising a linear regulator powered by said input voltage, said linear regulator providing a regulated voltage for charging said bootstrap capacitor.

8. A step-down converter for converting an input voltage to a lower output voltage, said converter comprising:

a pair of NMOS switches coupled in series, a first one of said pair of switches having a drain terminal coupled to said input voltage, a gate terminal, and a source terminal and a second one of said pair of switches having a source terminal coupled to ground, a drain terminal coupled to the source terminal of the said first switch, and a gate terminal, said pair of switches having complementary duty cycles;

an inductor having a first terminal coupled to the source terminal of the first switch and the drain terminal of said second switch and a second terminal providing an output terminal of the converter at which said output voltage is provided;

a capacitor having a first terminal coupled to said output terminal of said converter and a second terminal coupled to ground;

a gate drive circuit for providing a gate drive signal to each of said pair of switches to control said duty cycles of said pair of switches;

a bootstrap capacitor charged by a regulated voltage and coupled to said source terminal of said first switch, said bootstrap capacitor having a bootstrap voltage thereacross, said bootstrap voltage being greater than said input voltage and being provided to said gate drive circuit enabling said gate drive circuit to provide a gate drive signal to said first switch having a voltage greater than said input voltage;

a PWM circuit coupled between said output terminal and said gate drive circuit, said PWM circuit providing a PWM command signal to said gate drive circuit to control said duty cycles of said pair of switches; and a bootstrap controller for monitoring said bootstrap voltage, said controller providing a control signal to said PWM circuit for adjusting said PWM command signal so as to increase the duty cycle of said second switch in response to said bootstrap voltage being below a predetermined level and said first switch being closed.

9. The step-down converter recited in claim 8 wherein said bootstrap controller comprises a latch for providing said PWM override signal when said bootstrap voltage is below said predetermined level and said PWM command signal is at a level corresponding to approximately 100% duty cycle of said first switch and said first switch is closed.

10. The step-down converter recited in claim 8 wherein said predetermined level of said bootstrap voltage is greater than said input voltage.

11. The step-down converter recited in claim 9 wherein said latch is reset when said bootstrap voltage is greater than a second predetermined level and said first switch is closed.

12. A method for driving a high side switch of a synchronous Buck converter comprising said high side switch coupled to an input voltage and a low side switch coupled between said high side switch and ground, said high side switch and said low side switch being NMOS devices, comprising the steps of:

coupling a bootstrap capacitor between a regulated voltage and a source terminal of said high side switch, said source terminal being further coupled to a drain terminal of said low side switch;

charging said bootstrap capacitor through said low side switch when said low side switch is closed to provide a bootstrap voltage across said bootstrap capacitor;

driving said high side switch with a gate drive signal having a voltage level corresponding to said bootstrap voltage;

sensing said bootstrap voltage; and increasing the duty cycle of said low side switch in response to said bootstrap voltage being below a predetermined level and said high side switch being closed.

13. The method recited in claim 12 wherein said duty cycle increasing step comprises the steps of:

sensing when the duty cycle commanded of said high side switch is approximately 100%;

sensing when said high side switch is closed; and increasing said duty cycle of said low side switch when the duty cycle associated with said high side switch is approximately 100%, said high side switch is closed, and said bootstrap voltage is less than said predetermined level.

14. The method recited in claim 12 further comprising the step of ceasing to increase the duty cycle of said low side switch when said bootstrap voltage is greater than or equal to a second predetermined level and said high side switch is closed.

* * * * *